United States Patent
DeLuca, Jr. et al.

(10) Patent No.: US 6,471,762 B1
(45) Date of Patent: Oct. 29, 2002

(54) BONDED METAL-HYDROXIDE-ORGANIC COMPOSITE POLYMER FILMS ON LAMELLAR PIGMENTS

(75) Inventors: Carmine Vincent DeLuca, Jr.; Jeannine M. Gale, both of Peekskill, NY (US)

(73) Assignee: Engelhard Corp., NJ (US)

( * ) Notice: Subject to any disclaimer, the term of this patent is extended or adjusted under 35 U.S.C. 154(b) by 28 days.

(21) Appl. No.: 09/644,124

(22) Filed: Aug. 23, 2000

(51) Int. Cl.⁷ .......................... C09B 67/08; C09B 67/20; A61K 7/48; C09C 1/00
(52) U.S. Cl. ....................... 106/415; 106/410; 106/412; 106/413; 106/417; 106/447; 106/448; 106/460; 106/493; 106/496; 106/497; 106/498
(58) Field of Search ................................. 106/410, 412, 106/413, 415, 417, 493, 496, 497, 498, 447, 448, 460

(56) References Cited

U.S. PATENT DOCUMENTS

| | | | |
|---|---|---|---|
| 3,087,828 A | 4/1963 | Linton et al. ................ 106/417 |
| 3,418,146 A | 12/1968 | Rieger et la. ............... 106/440 |
| 3,437,515 A | 4/1969 | Quinn et al. ................. 427/164 |
| 4,038,099 A | 7/1977 | DeLuca, Jr. et al. ........ 106/417 |
| 4,084,983 A | 4/1978 | Bernhard et al. ........... 427/214 |
| 4,755,229 A | 7/1988 | Armanini .................... 106/413 |
| 4,818,614 A | 4/1989 | Fukui et al. ................. 428/403 |
| 4,968,351 A | 11/1990 | Ahmed et al. .............. 106/402 |
| 5,336,309 A | 8/1994 | Noguchi et al. ............. 106/230 |
| 5,885,342 A | 3/1999 | Gale et al. ................... 106/417 |

FOREIGN PATENT DOCUMENTS

| | | |
|---|---|---|
| DE | 42 25 031 A1 | 2/1994 |
| EP | 0 367 236 A1 A1 | 5/1990 |
| EP | 0 554 776 A1 | 8/1993 |
| EP | 0 558 032 A2 | 9/1993 |
| WO | WO98/50471 A1 | 11/1998 |
| WO | WO01/92425 A2 | 12/2001 |

OTHER PUBLICATIONS

Wang Shirong, et al., "An Investigation of Organic Dye-–Coloured Nacreous Pigments"; Dyes & Pigments; vol. 29, No. 2; pp. 161–168; 1995 (No Month).

*Primary Examiner*—Anthony J. Green
(74) *Attorney, Agent, or Firm*—Dickstein, Shapiro, Morin & Oshinsky, LLP.

(57) ABSTRACT

Colored lustrous pigments of superior quality are prepared by dry blending a platy substrate such as a metal oxide-coated mica nacreous pigment and a hydrophobic colorant at low shear. The resulting blend exhibits a well dispersed, stable coloration, increased hydrophobicity and is particularly useful in industrial and automotive applications. The technique can also be employed to prepare pigments for cosmetic application.

20 Claims, No Drawings

BONDED METAL-HYDROXIDE-ORGANIC COMPOSITE POLYMER FILMS ON LAMELLAR PIGMENTS

BACKGROUND OF THE INVENTION

Colored lustrous pigments are known in which the colorant is selected from a wide variety of inorganic and organic coloring agents or dyestuffs and the lustrous pigment is a natural pearlescent material or synthetic pearlescent substance (also called nacreous pigments). Numerous difficulties have been encountered in the prior art when making such colored lustrous pigments. For example, severe bleeding of the color on filtration of the coated product from suspension, poor adherence of the dyestuff on the surface of the pigment such that the color could be washed off with water, difficulty in retaining luster with increased color intensity, and non-uniform distribution of the dyestuff on the pigment surface have been noted.

U.S. Pat. No. 4,084,983 describes the foregoing problem, in part. That patent relates to the use of titanium dioxide coated mica pigments to produce colors due to the interference phenomenon and realizes additional color effects by coating organic dyes on the surface of those pigments. An improvement in the process of that patent is set forth in U.S. Pat. No. 4,968,351 in which is described a process of absorbing a soluble organic dyestuff at a coating pH on the surface of the metal oxide coated substrate nacreous pigment in an aqueous dispersion and subsequently absorbing a laking reagent thereon.

As apparent from the patents just described, the selection of treatment conditions to achieve a desired product can be difficult because, for example, the respective pigments and dyes have different cohesive forces. In addition, some pigments and dyes do not have sufficient dispersion stability and reaggregation of the pigment particles occurs and good coloration is not achieved.

A different approach is described in U.S. Pat. No. 5,336,309. In that patent, the platy substrate and dye are subjected to high speed stirring for a predetermined period of time in the absence of a liquid medium, for the purpose of coating the surfaces of the platy pigment with the dye by forming an "ordered mixture". This method of achieving colored lustrous pigments by high speed dry stirring or blending requires that the stirring energy imparted to the mixture be critically adapted into the components being blended. For example, Example 3 and Comparative Example 2 of the patent combined the same titanium oxide-coated mica with the same organic pigment. When the stirring energy was 84.2 kJ and the stirring speed of 70 m/sec was employed, a colored pigment with dispersibility was achieved. However, when the energy was 20.7 kJ and the stirring speed of 20 m/sec was employed, the resulting product was found to contain aggregates of the organic pigment particles. This patent teaches that the minimum amount of energy required is 25 J/cm$^3$ and preferably at least 33 J/cm$^3$.

U.S. Pat. No. 5,885,342 teaches that an improvement in the dry blending process can be achieved if certain selected adjuvants and a colorant lake are employed. For non-cosmetic applications, other colorants such as the phthalocyanines, quinacridones, perylenes, anthroquinones and the like can be used. The resulting product has increased hydrophobicity and requires a lower amount of energy to be used in the blending step. Stirring speed equivalent to those provided by the commercially available PK, Osterizer and Waring blenders can be used. The process improves the adherence and distribution of the dye on the pearlescent pigment and the resulting product is a stable dispersion, particularly suitable for use in cosmetic applications. The process, however, also requires high temperature drying to achieve preferred results and is costly. Also, some adjuvants need to be dissolved in a solvent and kept above ambient temperature during addition to avoid recrystallization, which leads to poor adhesion and loss of hydrophobicity.

It is therefore the object of the present invention to provide a new colored lustrous pearlescent pigment and a method by which such pigment can be manufactured. This and other objects of the invention will become apparent to those skilled in the art from the following detailed description.

SUMMARY OF THE INVENTION

The present invention relates to colored lustrous pigments of superior quality and to the process of producing them. More particularly, the invention relates to a colored lustrous pigment comprising platy substrate, such as a metal oxide-coated mica nacreous pigment, and a hydrophobic colorant, which is realized by blending the metal oxide-coated mica and colorant at an energy of less than about 20 J/cm$^3$.

DETAILED DESCRIPTION OF THE INVENTION

In accordance with the present invention, an improved colored lustrous pigment is achieved by dry blending a platy substrate such as a metal oxide-coated mica nacreous pigment with a hydrophobic colorant under low shear such that the energy is less that about 20 J/cm$^3$ and preferably less than about 10 J/cm$^3$.

The substrate can be any platy material such as mica flakes, sericite, kaolin, gypsum, bismuth oxychloride, glass and the like Suitable mixtures of platy substrates may also be used. Preferred are the well-known metal-oxide coated mica or glass nacreous or pearlescent pigments. They are exemplified by titanium dioxide-, zirconium dioxide- and/or iron oxide-coated mica or coated glass. These pigments are described, inter alia, in U.S. Pat. Nos. 3,437,515, 3,418,146, 3,087,828 and 4,038,099. The substrate may also be an optically variable pearlescent pigment. The preferred pigment is titanium dioxide-coated mica. The mica flake substrates generally have a length of about 1 to 75 microns, preferably about 5 to 35 microns, a thickness between about 0.03 and 3 microns and a specific surface area (BET) of about 1 to 10 m$^2$/g, preferably about 2 to 6 m$^2$/g. Usually, the titanium dioxide or other metal oxide is coated on the substrate surface to a thickness of about 20–350 nm. Depending on the thickness of the metal oxide coating, the pigments can exhibit interference or reflection colors of blue, green, yellow, red, etc. Any of the previously-known metal oxide-coated mica nacreous pigments can be employed in the present invention.

Any hydrophobic colorant can be used. The term "hydrophobic colorant", as used herein, means a material which has a contact angle of water of at least 90° and most preferably in excess of about 100°. The colorant may be organic such as phthalocyanine blue or green, quinacridone red, perrindo maroon, etc, or inorganic such as carbon black and the like. Indeed, any of the colorants listed in column 3 of the 5,336,309 patent can be employed as long as it is hydrophobic. When the intended use of the pigments of the present invention is in cosmetics, the dyes employed should be acceptable for such use. In the United States, such dyes are usually denoted by the nomenclature D&C or FD&C followed by the designated color and a number. The FD&C and D&C pigments are certified in the United States by the Division of Color Technology of the Food and Drug Administration of the Department of Health and Human Services. The specifications of these pigments are set forth in the Code of Federal Regulations, Title 21, Part 82, Subpart B, Section 82.51. An illustrative list of usable materials, provided the selected material is hydrophobic, including the chemical identity and structure of the dye are set forth in the aforementioned U.S. Pat. No. 4,968,351, the disclosure of which is hereby incorporated by reference. Mixtures of suitable colorants may also be used. In general, the colorant will constitute about 1 to 30% of the colorant-platy substrate combination and preferably about 1 to 10% by weight.

The blending time, temperature and stirring speeds which combine to achieve best results are dependent on the particular identity of each of the ingredients and the concentrations of each which are being employed. For instance, a blending time of 2 minutes may be adequate in some circumstances but inadequate in others. In most instances, ambient temperature is sufficient. Appropriate values for these parameters can be easily and quickly established by conducting a few preliminary procedures. In general, stirring speeds equivalent to those provided by the commercially-available PK, Osterizer and Waring blenders can be employed. The blending time can vary from a few seconds to several hours but is preferably about 1 to 30 minutes, more preferably about 2 to 7 minutes, in an Osterizer or Waring blender. The combination of stirring speed and time of stirring should be such that the energy imparted to the stirrer is less that about 20 $J/cm^3$ and more preferably less than about 10 $J/cm^3$. For example, using a PK blender, an energy of only 38 J/g and a stirring speed of only 10–14 m/sec, imparting an energy of 77 calories or less than 1 $J/cm^3$ can produce the desired results.

The resulting lustrous colored nacreous pigment has increased hydrophobicity. A convenient method of establishing the hydrophobicity is by measuring the contact angle of water with the resulting pigment. Surfaces exhibiting convex angles of water greater than about 90° are said to be hydrophobic. The procedure for carrying out this measurement is well-known. In general, the contact angle of water for the products of the present invention will be at least 90° and most preferably in excess of about 100°.

In order to further illustrate the present invention, various examples are set forth below. In these examples, as throughout this specification and claims, all temperatures are in degrees centigrade and all parts and percentages are by weight unless otherwise indicated.

EXAMPLE 1

A commercially available green colored titanium dioxide-coated mica (400 g) was placed in a PK blender and 10 g (dry basis) of a commercially available hydrophobic pigment Green-7 was added. The admixture was blended at a low shear of 38 J/g energy and 11 m/sec stirring speed. The resulting colored pigment had a deep color, good dispersability and good adhesion of colorant to the pearlescent $TiO_2$-coated mica pigment.

EXAMPLE 2

Example 1 was repeated except that the pigment was a commercially available blue colored titanium dioxide-coated mica and the colorant was Blue 15:3. The resulting colored pigment had a deep color, good dispersability and good adhesion of colorant to the pearlescent $TiO_2$-coated mica pigment.

EXAMPLE 3

Example 1 was repeated except that the pigment was a commercially available violet colored titanium dioxide-coated mica and the colorant was Carbazole Violet 23.

EXAMPLE 4

Example 1 was repeated except that the pigment was a commercially available russet colored iron oxide-coated mica and the colorant was Perrindo Maroon.

EXAMPLES 5–11

Products are formulated into lipsticks, eye shadow, cream eye shadow and lotions as shown in the following tables:

| LIPSTICK FORMULATIONS | | |
|---|---|---|
| Example | 5 | 6 |
| Lipstick Base | 40.30 | 40.30 |
| Castor Oil (q.s. to 100%) | 44.70 | 44.70 |
| Example 1 product | 15.00 | — |
| Example 2 product | — | 15.00 |
| Total | 100.00 | 100.00 |

| EYE SHADOW FORMULATIONS | | | | |
|---|---|---|---|---|
| Example | 7 | 7 | 8 | 9 |
| Talc | 34.30 | 34.30 | 38.60 | 34.30 |
| Zinc Stearate | 8.00 | 8.00 | 8.00 | 8.00 |
| Kaolin | 8.00 | 8.00 | 8.00 | 8.00 |
| Methylparaben | 0.40 | 0.40 | 0.40 | 0.40 |
| FD & C Blue #1 Lake | 9.37 | — | — | — |
| Gold $TiO_2$-coated mica | 32.93 | — | — | — |
| Example 1 product | — | 45.00 | — | — |
| Example 2 product | — | — | 45.00 | 45.00 |
| Mineral Oil | 7.00 | 4.30 | — | 4.30 |
| Total | 100.00 | 100.00 | 100.00 | 100.00 |

| EXAMPLE 10 CREAM EYE SHADOW FORMULATION | | |
|---|---|---|
| Phase | Ingredients | % wt. |
| I. | Water | 63.40 |
|  | Magnesium Aluminum Silicate | 1.50 |
|  | Methylparaben | 0.40 |
| II. | Propylene Glycol | 8.00 |
|  | Cellulose Gum | 1.00 |
| III. | Triethanolamine | 0.80 |
| IV. | Stearic Acid | 3.50 |
|  | Glycerol Stearate | 0.80 |
|  | Oleyl Alcohol | 0.50 |
|  | Propylparaben | 0.10 |
| V. | Example 1 product | 20.00 |
|  | Total | 100.00 |

| EXAMPLE 11 LOTION FORMULATION | | |
|---|---|---|
| Phase | Ingredients | % wt. |
| I. | Isopropyl Glycerol | 0.50 |
|  | Stearic Acid | 3.00 |

-continued

EXAMPLE 11 LOTION FORMULATION

| Phase | Ingredients | % wt. |
|---|---|---|
| | Glycerol Stearate | 2.00 |
| | Methyl Gluceth-10 | 15.00 |
| | Propylparaben | 0.10 |
| II. | Triethanolamine | 1.00 |
| | Water | 73.10 |
| | Methylparaben | 0.30 |
| III. | Example 2 product | 5.00 |
| | Total | 100.00 |

EXAMPLE 12

A lipstick is formulated employing 69.4 parts lipstick base, 15.6 parts castor oil and 15 parts of the blend of Example 1.

EXAMPLE 13

An eye shadow is prepared employing 14.8 parts talc, 20 parts mica, 5 parts magnesium myristate, 2 parts silica, 50 parts of the blend of Example 2, 7 parts octyl palmitate, 0.2 parts butylated hydroxytoluene and 1 part of isostearyl neopentanoate.

EXAMPLES 14–17

Water-based paints are prepared by incorporating one of the blends of Examples 1 through 4 into a water based paint composition at a pigment/paint ration of 0.13.

EXAMPLES 18–21

An automotive paint composition is prepared by combining one of the blends of Examples 1 through 4 at a 5% concentration into a commercial polyester powder coating composition (Corvel Clear No. 23-9030) by means of tumble mixing. Thereafter, the mixture is sprayed onto a metal substrate panel using a corona charge gun at 75 kv voltage and the resulting coated substrates is baked at 400° C. for 10 minutes.

Various changes and modifications can be made in the process and products of the present invention without departing from the spirit and scope thereof. The various embodiments which have been set forth herein were for the purpose of further illustrating the invention but were not intended to limit it.

What is claimed is:

1. A colored lustrous pigment consisting essentially of a dry blend of platy substrate and hydrophobic colorant which exhibits a contact angle of water of at least 90° C., wherein said dry blend has not been subjected to shear conditions such that energy of more than about 20 J/cm$^3$ was imparted to the blend.

2. The colored lustrous pigment of claim 1 in which the colorant is a phthalocyanine, quinacridone, perylene or anthroquinone.

3. The colored lustrous pigment of claim 2 in which the platy substrate is a metal oxide containing pearlescent pigment.

4. The colored pearlescent pigment of claim 3 in which the metal oxide is titanium dioxide or iron oxide and the colorant contact angle of water is at least about 100°.

5. The colored lustrous pigment of claim 1 in which the platy substrate is a metal oxide coated mica pearlescent pigment.

6. The colored pearlescent pigment of claim 1 in which the colorant contact angle of water is in excess of about 100°.

7. The colored lustrous pigment of claim 1 in which the platy substrate is a metal oxide containing pearlescent pigment.

8. The colored pearlescent pigment of claim 7 in which the metal oxide is titanium dioxide or iron oxide and the colorant contact angle of water is at least about 100°.

9. The colored lustrous pigment of claim 5 in which the platy substrate is an iron oxide coated mica pearlescent pigment.

10. The colored lustrous pigment of claim 1 in which the colorant is about 1–30% of the colorant-platy substrate blend.

11. A method of preparing a colored lustrous pigment comprising dry blending an admixture essentially of a dry blend of platy substrate and hydrophobic colorant under low shear conditions such that energy imparted to the blend is less than about 20 J/cm$^3$.

12. The method of claim 11 in which the colorant is a phthalocyanine, quinacridone, perylene or anthroquinone.

13. The method of claim 12 in which the platy substrate is a metal oxide containing pearlescent pigment.

14. The method of claim 13 in which the metal oxide is titanium dioxide or iron oxide.

15. The method of claim 12 in which the platy substrate is a metal oxide coated mica pearlescent pigment.

16. The method of claim 11 in which the platy substrate is a metal oxide containing pearlescent pigment.

17. The method of claim 11 wherein the energy imparted to the blend is less than about 10 J/cm$^3$.

18. A colored lustrous pigment produced by the process of claim 11.

19. A colored lustrous pigment produced by the process of claim 13.

20. A colored lustrous pigment produced by the process of claim 14.

* * * * *